United States Patent Office 3,435,036
Patented Mar. 25, 1969

3,435,036
DI- AND TRIPHENYLPROPYL PIPERA-
ZINE PYRIMIDYL AND QUINAZOLINYL
COMPOUNDS
Gilbert Regnier, Sceaux, Roger Canevari, La Hay-les-
Roses, Jean-Claude Le Douarec, Suresnes, and Michel
Laubie, Vaucresson, France, assignors to Science Union
Et Cie, Societe Francaise de Recherche Medicale,
Suresnes, France, a French society
No Drawing. Filed Dec. 7, 1966, Ser. No. 599,714
Claims priority, application Great Britain, Dec. 16, 1965,
53,477/65
Int. Cl. C07d 57/00
U.S. Cl. 260—256.4
12 Claims

ABSTRACT OF THE DISCLOSURE

Diphenylpropyl or triphenylpropyl-piperazines substituted at the other piperazine nitrogen atom by a heterocyclic radical selected from pyrimidyl and benzopyrimidyl radicals, and acid addition salts thereof; useful as analgesic and anti-inflammatory agents.

---

The present invention provides piperazine derivatives of the general formula

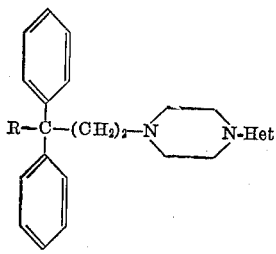

I wherein
R represents a hydrogen atom or a phenyl radical,
Het represents a heterocyclic radical of the general formula

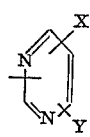

II or

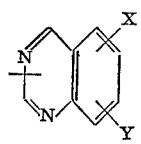

III which is attached at the 2- or 4-position to the piperazine residue and wherein X and Y, which may be the same or different, each represent a hydrogen atom or halogen atom, a hydroxyl group, a lower-alkyl radical containing up to 5 carbon atoms, a lower-alkoxy radical containing up to 5 carbon atoms, an amino, mono lower-alkyl or alkenyl-amino or di-lower-alkylamino group, and physiologically tolerable salts of such compounds.

The piperazine derivatives of this invention are new compounds and possess valuable pharmacological and therapeutic properties and may thus be used as medicaments, especially as analgesic, anti-inflammatory, antihypertensive and vasodilator medicaments.

The invention also provides pharmaceutical preparations which comprise a piperazine derivative of the above general formula or a physiologically tolerable salt thereof, in admixture or conjunction with a pharmaceutically suitable carrier.

The new derivatives can be prepared by condensing a halogenated derivative of the general formula Het-Z, where Het has the meaning given above and Z represents a chlorine or bromine atom, with an N-monosubstituted piperazine of the general formula

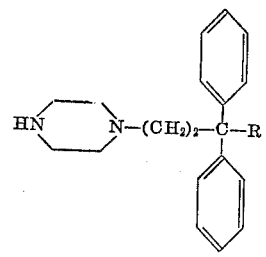

IV where R has the meaning defined above; or by condensation of a derivative of the general formula

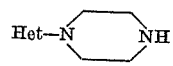

V where Het has the meaning given above—with a compound of the general formula

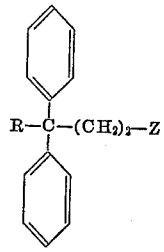

VI where R has the meaning given above, and Z represents a halogen, such as chlorine or bromine atom, or a sulphonic acid ester residue of the general formula

   Ar—SO$_3$   VII where Ar stands for a phenyl or para-tolyl radical.

Advantageously the present process is carried out by reacting a selected one of the afore-mentioned halogenated derivatives or sulphonic acid esters with an appropriate N-monosubstituted piperazine of the type IV or V, in the form of a solution in a polar solvent chosen from the group of conventional high-boiling alcohols such, for example, as butanol or isopentanol, or from the group of N,N-disubstituted aliphatic amides such, for example, as dimethylformamide or dimethyl-acetamide. It is advantageous to carry out the reaction within the temperature range from 120 to 150° C. in the presence of an acceptor for the hydrohalic acid or sulphonic acid formed during the reaction. This hydrohalic acid acceptor may be either an excess of the selected N-monosubstituted piperazine or an alkali metal or alkaline earth metal salt of carbonic acid such, for example, as sodium or potassium bicarbonate or carbonate, calcium carbonate, or a tertiary organic base such, for example, as dimethylaniline, pyridine or triethylamine.

If desired, the condensation of the afore-mentioned halogenated derivatives or sulphonic acid esters may alternatively be carried out in the presence of an excess of the selected N-monosubstituted piperazine which then serves both as a solvent and as an acceptor for the hydrohalic acid or sulphonic acid formed, at a temperature within the range from 120 to 150° C.

The new derivatives obtained in this manner are weak bases; they form acid addition salts with acids and are such likewise included in this invention. These acid addition salts are obtained by treating the new derivatives with acids in suitable solvents, for example, in water or water-miscible alcohols. As acids suitable for the formation of such acid addition salts there may be mentioned mineral acids, such as hydrochloric, hydrobromic, methanesulphonic, iséthionic, sulphuric, phosphoric, sulphamic acids, and from among suitable organic acids, for example, acetic, propionic, maleic, fumaric, tartaric, citric, oxalic, and benzoic acids.

If desired, the new derivatives may be purified by physical methods such, for example, as distillation, crystallisation or chromatography, or chemically by forming acid addition salts with acids and decomposing the resulting salts with alkaline agents.

These new compounds and their addition salts possess interesting therapeutic and pharmacological properties, and may be used as medicaments, especially as analgesics and anti-inflammatory agents.

Their toxicity was studied by oral and intravenous administration in mice. It was found that the median lethal dose varies from 75 to 500 mg./kg. intraperitoneally, and from 500 to 3500 mg./kg. orally.

The hot plate method was used to study the analgesic activity in mice (Woolf G. and MacDonald A. D., J. of Pharm. and Ther. 80 300 (1944)). In this test, an increase of the threshold of pain-perception varying from 25 to >100% was noted with doses of 10 to 80 mg./kg. IP or P.O. In comparison, codeine phosphate can be cited with an analgesic effect of 50% at 40 mg./kg. IP, and the 4-dimethylamino-3-methyl-1,2-diphenyl-2-butanol propionate (d-propoxyphene) with an effect of 25% at 40 mg./kg. P.O. in the same test.

A potent anti-inflammatory activity was observed, demonstrated on the plantar oedema of the rat's paw induced by carrageenin (Winter, C. A., et al., Proc. Soc. Exp. Biol. 111,544 (1962)). This inhibition varies from 20 to >50% with doses of 10 to 40 mg./kg. P.O. In comparison, the 4-butyl-1,2-diphenyl-3,5-pyrrolidinedione (phenylbutazone) inhibits inflammation of 30% with 40 mg./kg. P.O. in the same test.

The here-above mentioned properties, and the low toxicity of these compounds, enable their use in human or animal therapeutics, especially in the treatment of painful syndromes or inflammatory diseases.

These compounds can be administered in various pharmaceutically suitable solid or liquid carrier such as, for example, distilled water, glucose, lactose, talc, gum-arabic, magnesium stearate, ethylcellulose, etc.

The doses used can vary from 50 to 500 mg. in oral, rectal or parenteral administration.

Example 1.—1-[1′-(3′,3′-diphenyl propyl)] 4-(2″pyrimidyl) piperazine

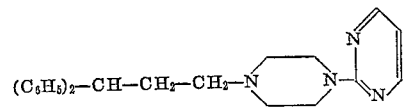

A solution of 14 grams of 1-[1′-(3′,3′-diphenyl propyl)] piperazine (B.P. 173–182° C. under 0.55 mm. Hg) and 16.4 grams of 2-chloro pyrimidine in 250 cc. of dimethylformamide in the presence of 27.6 grams of potassium carbonate was heated for 7 hours at 150° C. Then, the precipitate of potassium bromide formed was filtered off and the solvent evaporated under vacuum. The oily residue thus obtained was dissolved in 80 cc. of ethanol. On cooling, there were obtained 25 grams of 1-[1′-(3′,3′-diphenyl propyl)] 4-(2″-pyrimidyl) piperazine melting at 111° C.

The starting material, that is 1-[1′-(3′,3′-diphenyl propyl)] piperazine, whose dihydrochloride melts at 215 to 218° C., was obtained by reacting piperazine (anhydrous) in 95% ethanol with 3′,3′-diphenyl propyl bromide.

By the same method, the following derivatives were prepared:

(a) 1-[1′,(3′,3′-diphenylpropyl)] 4-(4″-pyrimidyl) piperazine. The fumarate monohydrate of the product thus obtained melted at 233–237° C.

(b) 1-[1′-(3′,3′-diphenyl propyl)] 4-[2″-(5″-chloro pyrimidyl)] piperazine. The methane sulmonate of the product thus obtained melted at 251° C.

(c) 1-[1′-(3′,3′-diphenyl propyl)] 4-[2″-(4″-methyl pyrimidyl)] piperazine, melting at 80° C.

(d) 1-[1′-(3′,3′-diphenyl propyl)] 4-[2″-(4″,5″-dimethyl pyrimidyl)] piperazine. The fumarate melted at 195–205° C. (with decomposition).

(e) 1-[1′-(3′,3′-diphenyl propyl)] 4-[2″-(4″,6″-dimethyl pyrimidyl)] piperazine melting at 103–105° C.

(f) 1-[1′-(3′,3′-diphenyl propyl)] 4-[2″-(4″-methoxy pyrimidyl)] piperazine melting at 88° C.

(g) 1-[1′-(3′,3′-diphenyl propyl)] 4-[2″-(4″-amino pyrimidyl)] piperazine. The dihydrochloride melted at 164–165° C.

(h) 1-[1′-(3′,3′-diphenyl propyl)] 4-[2″-(4″-amino pyrimidyl)] piperazine. The dihydrochloride melted at 175–178° C.

(i) 1-[1′-(3′,3′-diphenyl propyl)] 4-[2″-(4″-dimethylamino pyrimidyl)] piperazine. The dihydrochloride melted at 178–181° C.

(j) 1-[1′-(3′,3′-diphenyl propyl)] 4-(2″-benzo pyrimidyl) piperazine. The dihydrochloride melted at 235–240° C.

(k) 1-[1′-(3′,3′-diphenyl propyl) 4-(4″-benzo pyrimidyl) piperazine. The dihydrochloride melted at 230–235° C.

(l) 1-[1′-(3′,3′-diphenyl propyl)] 4-[4″-(2″-methyl benzo pyrimidyl)] piperazine. The fumarate hemihydrate melted at 167–170° C.

Example 2.—1-[1′-(3′,3′,3′-triphenyl propyl)] 4-(2″-pyrimidyl) piperazine

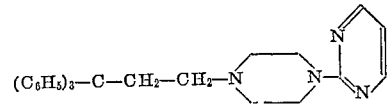

In operating as in Example 1, from 25 grams of 1-[1′-(3′,3′,3′-triphenyl propyl)] piperazine (B.P. 227–228° C. under 0.5 mm. Hg), and 8.02 grams of 2-chloro pyrimidine dissolved in 400 cc. of dimethylformamide, in the presence of 19.3 grams of dry potassium carbonate, there were obtained, after heating 5 hours at 135° C., 22 grams of 1-[1′-(3′,3′,3′-triphenyl propyl)] 4-(2″-pyrimidyl) piperazine melting at 130° C.

The starting material, that is 1-[1′-(3′,3′,3′-triphenyl propyl)] piperazine (dimethylsulfonate, M.P. 184–187° C.) is obtained by treating the tosylate of 3,3,3-triphenyl-1-propanol with an excess of anhydrous piperazine at 140° C.

By the method described in example 2, the following derivatives were prepared:

(a) 1-[1′-(3′,3′,3′-triphenyl propyl)] 4-(4″-pyrimidyl) piperazine. The dihydrate melted at 64–66° C.

(b) 1-[1′-(3′,3′,3′-triphenyl propyl)] 4-[2″-(5″-chloro pyrimidyl] piperazine melting at 124° C.

(c) 1-[1′-(3′,3′,3′-triphenyl propyl)] 4-[2″-(4″-hydroxy pyrimidyl)] piperazine. The dihydrochloride hydrate melted at 176–180° C. (with decomposition).

(d) 1-[1′-(3′,3′,3′-triphenyl propyl)] 4-[2″-(4″-methyl pyrimidyl)] piperazine melting at 128° C.

(e) 1-[1′-(3′,3′,3′-triphenyl propyl)] 4-[2″-(4″,5″-dimethyl pyrimidyl)] piperazine. The fumarate melted at 190–200° C. (with decomposition).

(f) 1-[1′-(3′,3′,3′-triphenyl propyl)] 4-[2″-(4″,6″-dimethyl pyrimidyl)] piperazine melting at 140° C.

(g) 1-[1′-(3′,3′,3′-triphenyl propyl)] 4-[2″-(4″-methoxy pyrimidyl)] piperazine melting at 125° C.

(h) 1-[1′-(3′,3′,3′-triphenyl propyl)] 4-[2″-(4″-amino pyrimidyl)] piperazine. The dihydrate melted at 132–140° C.

(i) 1-[1′-(3′,3′,3′-triphenyl propyl)] 4-[4″-(2″-amino pyrimidyl)] piperazine melting at 188–190° C.

(j) 1-[1'-(3',3',3'-triphenyl propyl)] 4-[2"-(4"-methyl amino pyrimidyl)] piperazine melting at 150–153° C.

(k) 1-[1'-(3',3',3'-triphenyl propyl)] 4 - [2" - (4"-dimethyl amino pyrimidyl)] piperazine melting at 115° C.

(l) 1-[1'-(3',3',3'-triphenyl propyl)] 4-[2"-(4" - allyl amino pyrimidly)] piperazine melting at 154–158° C.

(m) 1-[1'-(3',3',3'-triphenyl propyl)] 4-(2"-benzo pyrimidyl) piperazine. The fumarate melted at 195–200° C. (with decomposition).

(n) 1-[1'-(3',3',3'-triphenyl propyl)] 4-(4"-benzo pyrimidyl) piperazine. The dihydrochloride melted at 155–160° C.

(o) 1-[1'-(3',3',3'-triphenyl propyl)] 4-[4"-(2"-methyl benzo pyrimidyl)] piperazine. The fumarate melted at 205–210° C. (with decomposition).

Example 3.—1-[1'-(3',3'-diphenyl propyl)] 4-(2"-pyrimidyl) piperazine

A solution of 13.7 grams of 3,3-diphenyl 1-bromo propane (B.P. 170–180° C. under 0.7 mm. Hg pressure) and 8.2 grams of 1-(2'-pyrimidyl) piperazine (B.P. 104– 106° C. under 0.7 mm. Hg pressure) in 250 cc. of dimethylformamide was heated in the presence of 13.8 grams of potassium carbonate for 7 hours at 150° C., whereupon the precipitate of potassium bromide formed was filtered off and the filtrate was evaporated under vacuum. The oily residue thus obtained was dissolved in 40 cc. of ethanol. On cooling, there were obtained 10.7 grams of crystalline 1 - [1' - (3',3'-diphenyl propyl)] 4-(2"-pyrimidyl) piperazine, melting at 111° C.

Example 4.—1-[1'-(3',3',3'-triphenyl propyl)] 4-(2"-pyrimidyl) piperazine

A solution of 8.8 grams of the tosylate of 3',3',3'-triphenyl-1-propanol (M.P. 116° C.) and 3.11 grams of 1-(2'-pyrimidyl) piperazine in 150 cc. of dimethylformamide was heated for 20 hours at 150° C. in the presence of 5.5 grams of potassium carbonate, whereupon the salt formed was filtered off and the filtrate evaporated under vacuum.

The resulting oily residue was dissolved in 100 cc. of benzene and the benzene solution was repeatedly extracted with methanesulphonic acid of 50% strength. The sparingly soluble methanesulphonate precipitated in the form of an oil which was decanted with the acid phase. The acid solutions as well as the oily phase were washed with ether and then rendered alkaline with potassium carbonate. The oily layer formed was extracted with chloroform and the extract was dried an evaporated to yield 5 grams of a resins which crystallized after having been dissolved in 20 cc. of ethanol under reflux. Finally, there were obtained 2.1 grams of 1-[1'-(3',3',3'-triphenyl propyl)]4-(2"-pyrimidyl)piperazine melting at 130° C.

The tosylate of 3,3,3-triphenyl 1-propanol used as starting material was obtained by the action of tosylchloride upon 3,3,3-triphenyl 1-propanol in pyridine.

Various modifications and equivalents will be apparent to one skilled in the art and may be made in the compounds, compositions, and methods of the present invention without departing from the spirit or scope thereof, and it is therefore to be understood that the invention is to be limited only by the scope of the appended claims.

What we claim is:

1. A compound selected from the group consisting of (A) piperazine compounds of the Formula I

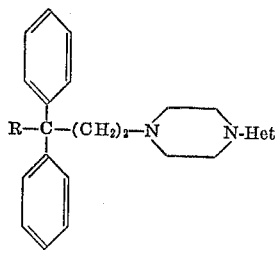

wherein
R represents hydrogen or phenyl,
Het represents a heterocyclic radical of the Formula II or III

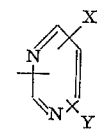

II

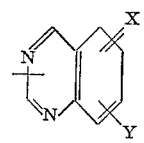

III which is attached at the 2- or 4-position to the piperazine nitrogen and wherein X and Y, each independently, represent hydrogen or halogen, hydroxyl, lower-alkyl containing up to 5 carbon atoms, lower-alkoxy containing up to 5 carbon atoms, amino, mono lower-alkylamino or alkenylamino, or di-lower-alkylamino, and (B) physiologically acceptable addition salts thereof with organic and mineral acids.

2. A compound of claim 1 which is 1-[1'-(3',3'-diphenyl propyl)]4-[2"-(4",6"-dimethyl pyrimidyl)]piperazine.

3. A compound of claim 1 which is 1-[1'-(3',3'-diphenyl propyl)]4-[2"-(4"-methyl amino pyrimidyl)]piperazine.

4. A compound of claim 1 which is 1-[1'-(3',3'-diphenyl propyl)]4-(2"-benzo pyrimidyl)piperazine.

5. A compound of claim 1 which is 1-[1'-(3',3',3'-triphenyl propyl)]4-(2"-pyrimidyl)piperazine.

6. A compound of claim 1 which is 1-[1'-(3',3',3'-triphenyl propyl)]4 - [2"-(4"-hydroxy pyrimidyl)]piperazine.

7. A compound of claim 1 which is 1-[1'-(3',3',3'-triphenyl propyl)]4-[2"-(4"-methyl pyrimidyl)]piperazine.

8. A compound of claim 1 which is 1-[1'-(3',3',3'-triphenyl propyl)]4-[2"-(4",5"-dimethyl pyrimidyl)]piperazine.

9. A compound of claim 1 which is 1-[1'-(3',3',3'-triphenyl propyl)]4 - [2"-(4"-methoxy pyrimidyl)]piperazine.

10. A compound of claim 1 which is 1-[1'-(3',3',3'-triphenyl propyl)]4-[2"-(4"-amino pyrimidyl)]piperazine.

11. A compound of claim 1 which is 1-[1'-(3',3',3'-triphenyl propyl)]4-(4"-benzo pyrimidyl)piperazine.

12. A compound of claim 1 which is 1-[1'-(3',3',3'-triphenyl propyl)]4-[4"-(2"-methyl benzo pyrimidyl)]piperazine.

References Cited

UNITED STATES PATENTS 2,562,036  7/1951  Hultquist et al. _____ 260—256.4
3,184,462  5/1965  Scarborough et al. ___ 260—256.4

ALEX MAZEL, Primary Examiner.

R. J. GALLAGHER, Assistant Examiner.

U.S. Cl. X.R.

260—268, 456, 256.5, 256.4; 424—251

PO-1050
(5/69)

UNITED STATES PATENT OFFICE
CERTIFICATE OF CORRECTION

Patent No. 3,435,036          Dated March 25, 1969

Inventor(s) Gilbert Regnier, et al.

It is certified that error appears in the above-identified patent and that said Letters Patent are hereby corrected as shown below:

Column 3, line 45, "various pharmaceutically suitable" to read --various pharmaceutical forms in admixture or conjunction with a pharmaceutically suitable--. Column 4, line 4, "sulmonate" to read --sulfonate--. Column 6, Formula III should read:

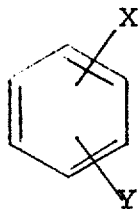

Instead of:

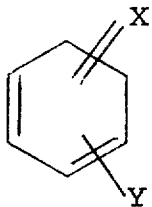

SIGNED AND
SEALED
MAR 10 1970

(SEAL)
Attest:

Edward M. Fletcher, Jr.
Attesting Officer

WILLIAM E. SCHUYLER, JR.
Commissioner of Patents